US008549896B2

(12) United States Patent
Kobayashi et al.

(10) Patent No.: US 8,549,896 B2
(45) Date of Patent: Oct. 8, 2013

(54) VANE PUMP AND EVAPORATION LEAK CHECK SYSTEM USING THE SAME

(75) Inventors: Mitsuyuki Kobayashi, Gamagori (JP); Tomohiro Itoh, Takahama (JP); Shinji Sugihara, Mizuho (JP)

(73) Assignee: Denso Corporation, Kariya (JP)

( * ) Notice: Subject to any disclaimer, the term of this patent is extended or adjusted under 35 U.S.C. 154(b) by 361 days.

(21) Appl. No.: 12/965,963

(22) Filed: Dec. 13, 2010

(65) Prior Publication Data

US 2011/0138885 A1 Jun. 16, 2011

(30) Foreign Application Priority Data

Dec. 11, 2009 (JP) ................................ 2009-281689

(51) Int. Cl.
*G01M 3/20* (2006.01)

(52) U.S. Cl.
USPC ........................................... 73/40.7; 418/228

(58) Field of Classification Search
USPC ........................................................ 73/40.7
See application file for complete search history.

(56) References Cited

U.S. PATENT DOCUMENTS 7,014,439 B2 * 3/2006 Kano et al. .................... 418/259
7,237,432 B2 * 7/2007 Inagaki et al. ............. 73/114.39
7,472,583 B2 * 1/2009 Kato et al. ..................... 73/49.7
7,993,119 B2 * 8/2011 Kobayashi et al. ........... 418/133
2009/0148329 A1 6/2009 Kobayashi et al.
2011/0123371 A1 * 5/2011 Yasuzaka et al. .......... 417/410.1
2011/0123372 A1 * 5/2011 Itoh et al. .................. 417/410.1
2011/0311385 A1 * 12/2011 Kobayashi et al. ........... 418/104

FOREIGN PATENT DOCUMENTS

JP H1-253582 10/1989
JP P2003-343463 A 12/2003

* cited by examiner

*Primary Examiner* — Hezron E Williams
*Assistant Examiner* — Mark A Shabman
(74) *Attorney, Agent, or Firm* — Nixon & Vanderhye P.C.

(57) ABSTRACT

A vane pump has an upper casing, a lower casing, a rotor and a motor. First to fourth points are defined on an outer peripheral end of a lower flat surface of the lower casing. The first point is farthest from an intersection between an axis of a shaft of the motor and the lower flat surface. A suction passage passing through the third point and a discharge passage passing through the second point are formed between the upper casing and the lower casing. The fourth point is defined in a range from the third point to the first point. The lower flat surface is provided to incline with respect to the axis of the shaft of the motor such that the fourth point is farthest from a motor case of the motor among points on the outer peripheral end.

6 Claims, 7 Drawing Sheets

VANE PUMP AND EVAPORATION LEAK CHECK SYSTEM USING THE SAME

CROSS REFERENCE TO RELATED APPLICATION

This application is based on and incorporates herein by reference Japanese Patent Application No. 2009-281689 filed on Dec. 11, 2009.

BACKGROUND OF THE INVENTION

1. Field of the Invention

The present invention relates to a vane pump. In particular, the present invention relates to a vane pump suitably used in an evaporation leak check system and the like.

2. Description of Related Art

Conventionally, there is known a vane pump that drives and rotates a rotor having vanes by using a motor to pressurize and discharge a fluid. For example, Patent document 1 (JP-A-2009-138602) describes a vane pump used for depressurizing or pressurizing an inside of a fuel tank in an evaporation leak check system that checks leakage of fuel vapor from the fuel tank. In such the system, pump performance of the vane pump easily affects system performance.

The vane pump has a rotor substantially in the shape of a circular cylinder accommodated in a pump chamber defined by an upper casing and a lower casing. A suction passage and a discharge passage are formed between the upper casing and the lower casing to provide communication between an inside and an outside of the pump chamber. A shaft of the motor is loosely fitted in a central hole of the rotor.

In the vane pump having the above-described construction, the rotor rotates in the pump chamber with rotation of the shaft. If the rotor rotates, the fluid outside the pump chamber is suctioned into the pump chamber through the suction passage. The suctioned fluid is compressed by the rotation of the rotor and discharged to the outside of the pump chamber through the discharge passage. At that time, negative pressure arises near the suction passage inside the pump chamber. If the negative pressure arises near the suction passage of the pump chamber, there is a case where the rotor inclines to the suction passage side and an orientation of the rotor during the rotation of the rotor changes. If the rotor inclines, a contact state between the vanes attached to the rotor and an inner peripheral wall of the upper casing changes. As a result, there is a possibility that air-tightness of spaces of the pump chamber partitioned by the vanes changes and pump performance changes. If such the vane pump is used for the evaporation leak check system, it becomes difficult to correctly check the leak of the fuel vapor.

SUMMARY OF THE INVENTION

It is an object of the present invention to provide a vane pump capable of maintaining stable pump performance. It is another object of the present invention to provide an evaporation leak check system capable of maintaining stable check performance.

According to a first example aspect of the present invention, a vane pump has an upper casing, a lower casing, a rotor and a motor. The upper casing consists of a cylinder section substantially in the shape of a circular cylinder and a plate section having an upper flat surface substantially in a round shape blocking an opening in an end portion of the cylinder section on a first side of the vane pump. Thus, the upper casing is formed in the shape of a cylinder having a bottom. The lower casing is formed in a plate-like shape. The lower casing has a lower flat surface substantially in a round shape blocking an opening in an end portion of the upper casing on a second side of the vane pump. The lower casing defines a pump chamber inside the lower flat surface, the upper flat surface of the plate section and an inner peripheral wall of the cylinder section. The rotor is formed substantially in the shape of a circular cylinder and is rotatably accommodated in the pump chamber to be decentered with respect to the cylinder section. The rotor has a central hole penetrating through a central portion thereof in an axial direction and a plurality of vanes capable of sliding on the inner peripheral wall of the cylinder section. The motor has a motor case substantially in the shape of a circular cylinder provided on a side of the lower casing opposite to the plate section and a shaft that extends from the motor case in the axial direction and that is loosely fitted in the central hole. The motor drives and rotates the rotor by rotating the shaft.

According to the first example aspect of the present invention, a point on an outer peripheral end of the lower flat surface of the lower casing farthest from an intersection between an axis of the shaft and the lower flat surface is defined as a first point. A point on the outer peripheral end of the lower flat surface at which a virtual straight line extending from a central point of the lower flat surface and passing through the first point intersects with the outer peripheral end of the lower flat surface when the virtual straight line rotates by 90 degrees in a rotation, direction of the rotor around the central point is defined as a second point. A point on the outer peripheral end of the lower flat surface opposite from the second point across the central point is defined as a third point. A point on the outer peripheral end of the lower flat surface in a range from the third point to the first point is defined as a fourth point.

A suction passage passing through the third point for connecting an outside and an inside of the pump chamber and for passing a fluid suctioned to the inside of the pump chamber is formed between the upper casing and the lower casing. A discharge passage passing through the second point for connecting the inside and the outside of the pump chamber and for passing the fluid discharged to the outside of the pump chamber is formed between the upper casing and the lower casing.

The lower flat surface of the lower casing is provided to incline with respect to the axis of the shaft such that the fourth point is farthest from the motor case among points on the outer peripheral end of the lower flat surface. That is, the lower flat surface of the lower casing is inclined with respect to the shaft such that a distance between the lower flat surface and the motor case increases along a direction from the central point toward the fourth point. Therefore, an outer edge section of an end face of the rotor on the lower flat surface side is invariably and slidably in contact with a point of the lower flat surface near the fourth point.

The fourth point is an arbitrary point in a range on the outer peripheral end of the lower flat surface from the third point (where suction passage is formed) to the first point. That is, the outer edge section of the end face of the rotor on the lower flat surface side can be slidably in contact with the point of the lower flat surface in the range from a certain position near the suction passage to a position rotated from the certain position in the rotation direction of the rotor by 90 degrees. Thus, even if the negative pressure arises near the suction passage in the pump chamber, the inclination of the rotor toward the suction passage side can be inhibited.

In this way, according to the present invention, a part of the rotor is invariably and slidably in contact with a point of the lower flat surface in the range from the suction passage to the position distanced from the suction passage by a predetermined distance during the rotation of the rotor. Accordingly, even if the negative pressure arises near the suction passage, an orientation of the rotor during the rotation can be stabilized. Therefore, stable pump performance of the vane pump can be maintained.

According to a second example aspect of the present invention, in the vane pump, a point on an outer peripheral end of the upper flat surface of the plate section crossing a virtual straight line that passes through the fourth point and that extends in parallel with an axis of the cylinder section is defined as a fifth point. The upper flat surface is provided to incline with respect to the axis of the shaft such that the fifth point is farthest from the motor case among points on the outer peripheral end of the upper flat surface.

That is, the upper flat surface of the plate section is inclined with respect to the shaft such that a distance between the upper flat surface and the motor case increases along a direction from a central point of the upper flat surface toward the fifth point. In such the construction, a point on the outer peripheral end of the upper flat surface at a position opposite from the fifth point across the central point of the upper flat surface may be defined as a sixth point. In such the case, an outer edge section of the end face of the rotor on the lower flat surface side can be invariably and slidably in contact with a point of the lower flat surface near the fourth point during the rotation of the rotor. In addition, also an outer edge section of an end face of the rotor on the upper flat surface side can be invariably and slidably in contact with a point of the upper flat surface near the sixth point during the rotation of the rotor. As a result, the orientation of the rotor during the rotation can be stabilized further.

According to a third example aspect of the present invention, in the vane pump, a point on an outer peripheral end of the upper flat surface of the plate section crossing a virtual straight line that passes through the fourth point and that extends in parallel with an axis of the cylinder section is defined as a fifth point. The upper flat surface is provided to incline with respect to the axis of the shaft such that the fifth point is closest to the motor case among points on the outer peripheral end of the upper flat surface.

That is, the upper flat surface of the plate section is inclined with respect to the shaft such that a distance between the upper flat surface and the motor case decreases along a direction from the central point of the upper flat surface toward the fifth point. With such the construction, an outer edge section of the end face of the rotor on the lower flat surface side can be invariably and slidably in contact with a point of the lower flat surface near the fourth point during the rotation of the rotor. In addition, an outer edge section of the end face of the rotor on the upper flat surface side can be invariably and slidably in contact with a point of the upper flat surface near the fifth point. As a result, the orientation of the rotor can be further stabilized during the rotation of the rotor.

According to a fourth example aspect of the present invention, an evaporation leak check system has the above-described vane pump. Accordingly, the evaporation leak check system depressurizes or pressurizes an inside of a fuel tank with the vane pump having the stable pump performance. Therefore, the evaporation leak check system can maintain stable check performance.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereafter, embodiments of the present invention will be described with reference to the drawings. The same sign is used for substantially the same component among the embodiments.

(First Embodiment)

Figure 1:
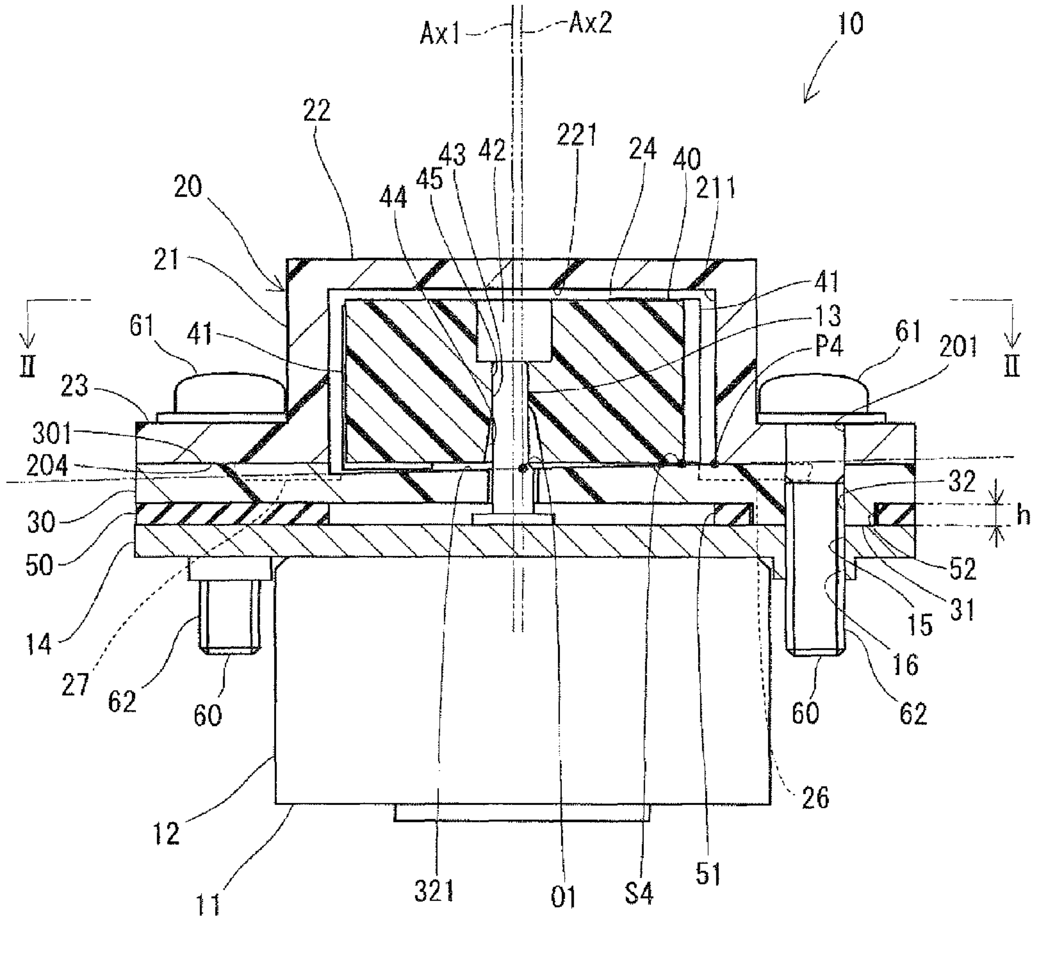
FIG. 1 is a cross-sectional view showing a vane pump according to a first embodiment of the present invention.
Figure 2:
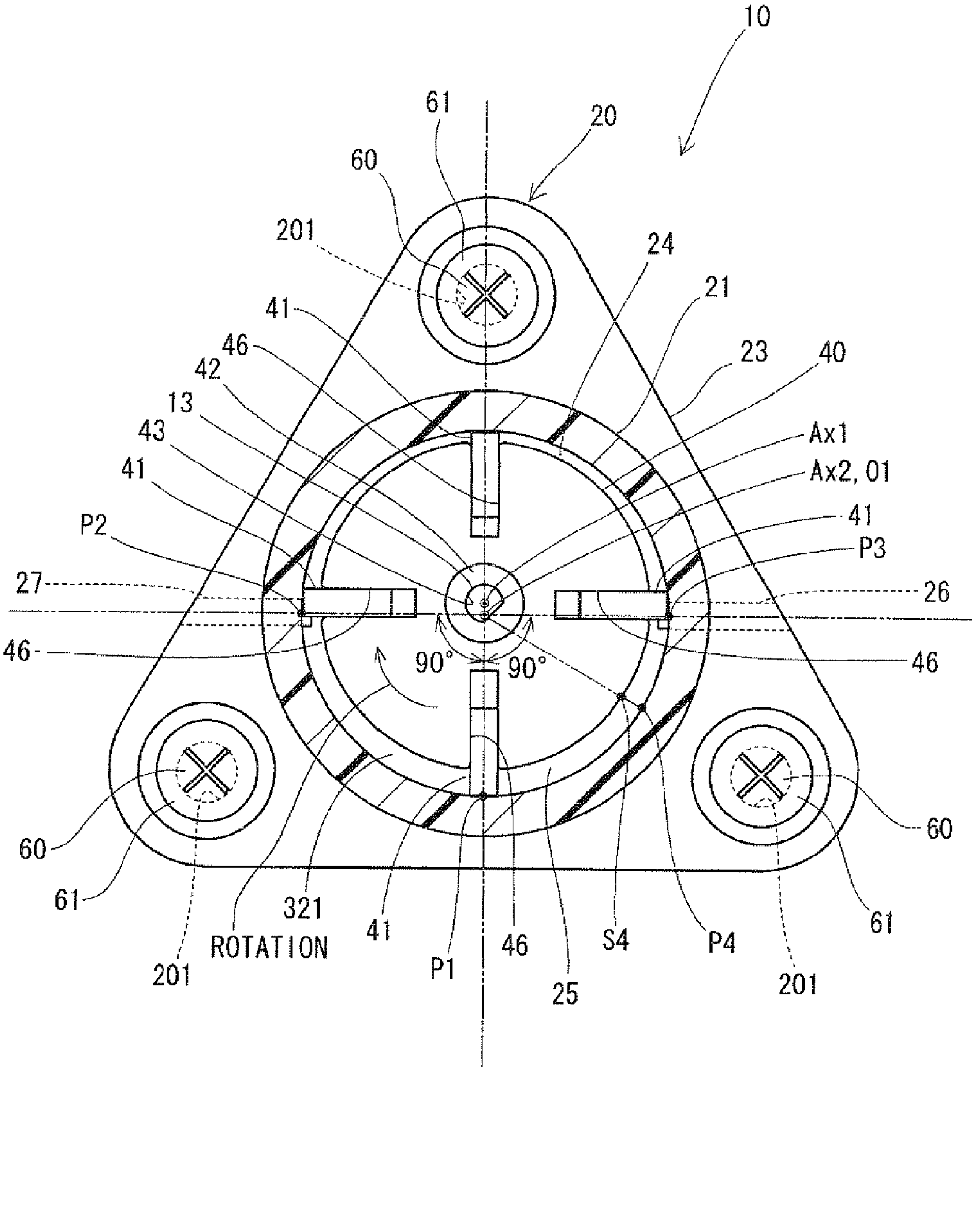
FIG. 2 is a view showing the vane pump of FIG. 1 taken along the line II-II.
Figure 3:
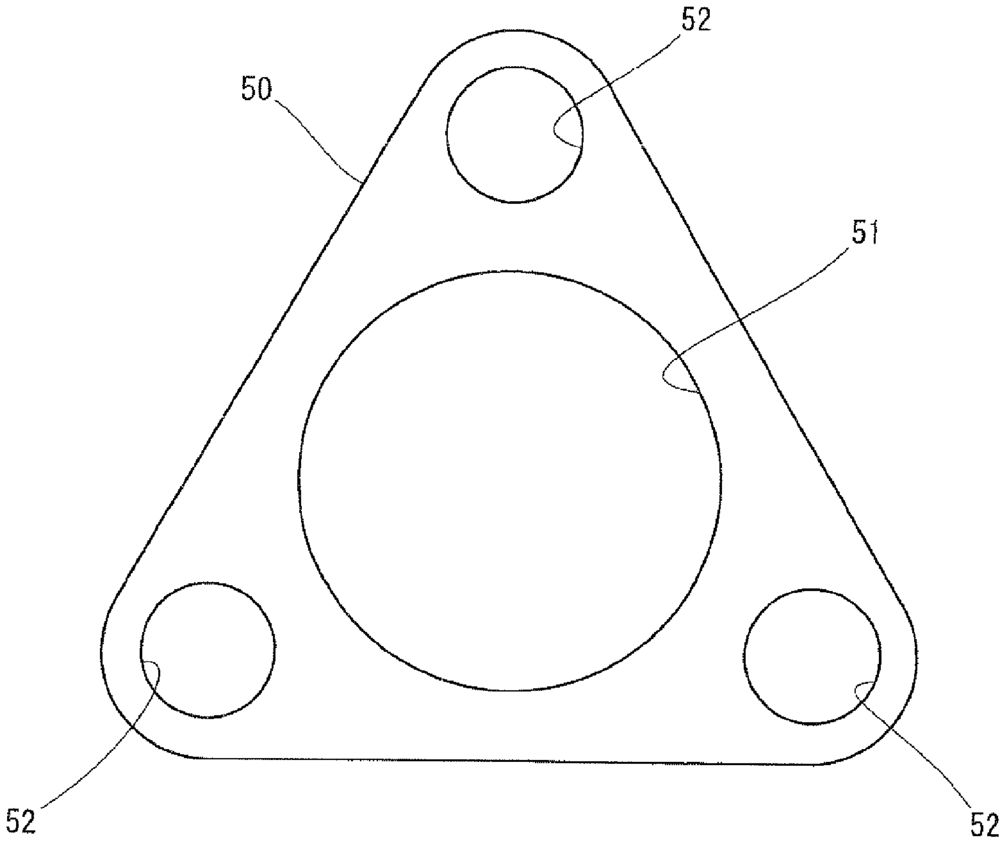
FIG. 3 is a view showing an elastic sheet of the vane pump according to the first embodiment.

FIGS. 1 to 3 show a vane pump and parts of the vane pump according to a first embodiment of the present invention. The vane pump 10 suctions, compresses and discharges a fluid. The fluid compressed by the vane pump 10 may be a gas such as air or a liquid such as water.

The vane pump 10 has an upper casing 20, a lower casing 30, a rotor 40, a motor 11 and the like. The rotor 40 of the vane pump 10 is driven and rotated by the motor 11 provided across the lower casing 30 and an elastic sheet 50. A direct current electric motor or an alternating current electric motor is used as the motor 11, for example.

The upper casing 20 has a cylinder section 21, a plate section 22 and a flange section 23. The upper casing 20 is molded as an integral body with a material such as a resin. The cylinder section 21 is formed substantially in the shape of a circular cylinder. An inner peripheral wall 211 of the cylinder section 21 is substantially in the shape of an inner surface of a circular cylinder. The plate section 22 is formed on one end portion side of the cylinder section 21. The plate section 22 has an upper flat surface 221 substantially in a round shape to block an opening in the one end portion of the cylinder section 21. The flange section 23 is formed to expand radially outward from the other end portion of the cylinder section 21. A flat surface section 204 is formed on an end face of the flange section 23 opposite from the plate section 22. In this way, the upper casing 20 is formed in the shape of a cylinder having a bottom.

The lower casing 30 is molded in the shape of a plate with a material such as a resin. A flat surface section 301 is formed on an outer edge section of an end face of the lower casing 30 on the upper casing 20 side. The flat surface section 301 is joined to the flat surface section 204 of the upper casing 20. Thus, a lower flat surface 321 formed substantially in a round shape inside the flat surface section 301 of the lower casing 30 blocks an opening in the other end portion of the cylinder section 21. Thus, a pump chamber 24 surrounded by the lower flat surface 321, the upper flat surface 221 and the inner peripheral wall 211 of the cylinder section 21 is defined on an inner peripheral side of the cylinder section 21. The lower flat surface 321 will be explained in more detail later.

The rotor 40 is formed substantially in the shape of a circular cylinder with a material such as a resin. The rotor 40 is accommodated in the pump chamber 24 rotatably. Thus, a space 25 surrounded by the cylinder section 21 and the plate section 22 of the upper casing 20, the lower casing 30 and the rotor 40 is formed (refer to FIG. 2). In the present embodiment, the rotor 40 is accommodated in the pump chamber 24 in a state where the rotor 40 is decentered with respect to the cylinder section 21. That is, an axis of the rotor 40 and an axis of the cylinder section 21 do not coincide with each other but are deviated from each other. Therefore, a volume (or width) of the space 25 formed between the cylinder section 21 and the rotor 40 is uneven in the circumferential direction.

The rotor 40 has a concave section 42 and a central hole 43 in a central portion thereof. The concave section 42 is formed to reduce thickness of the rotor 40 by denting an end face of the rotor 40 on the plate section 22 side to a middle in an axial direction. The central hole 43 penetrates through the rotor 40 in a board thickness direction of the rotor 40 to provide communication between the lower casing 30 side of the rotor 40 and the concave section 42. The central hole 43 has a tapered hole 44 formed in a tapered shape such that a diameter of the tapered hole 44 gradually reduces from an end portion of the central hole 43 on the lower casing 30 side to a middle of the central hole 43 in the axial direction. The central hole 43 has a noncircular hole 45 that has a noncircular cross-sectional shape and that extends from the middle of the central hole 43 in the axial direction to a position connecting to the concave section 42.

The motor 11 has a motor case 12 and a shaft 13. The motor case 12 is formed substantially in the shape of a circular cylinder and is provided on a side of the lower casing 30 opposite from the plate section 22. The motor case 12 is combined with an attachment 14 used for attaching the upper casing 20, the lower casing 30 and the elastic sheet 50 to each other. A stator (not shown) is accommodated in the motor case 12. The shaft 13 is connected to a movable member (not shown) provided inside the stator and is provided to extend in the axial direction of the motor case 12. If an electric power is supplied to the stator, the shaft 13 rotates with the movable member. An axis of the motor case 12 coincides with an axis Ax1 of the shaft 13.

The shaft 13 of the motor 11 is inserted in the central hole 43. When the shaft 13 is inserted into the central hole 43 of the rotor 40, the shaft 13 is fitted into the noncircular hole 45 while the shaft 43 is guided by the tapered hole 44. A cross-sectional shape of the shaft 13 is formed to be substantially identical to the cross-sectional shape of the noncircular hole 45 in a range from a middle of the shaft 13 in the axial direction to an end portion of the shaft 13 on the concave section 42 side. A cross-sectional area of the noncircular hole 45 is larger than a cross-sectional area of the end portion of the shaft 13. That is, a gap is formed between an inner wall of the rotor 40 defining the noncircular hole 45 and an outer wall of the shaft 13. Therefore, the shaft 13 is loosely fitted to the rotor 40 in a manner corresponding to the shape of the noncircular hole 45. Thus, if the shaft 13 rotates, the rotor 40 rotates with the shaft 13 without causing the shaft 13 to spin around separately from the rotor 40. In the present embodiment, the rotor 40 rotates clockwise in FIG. 2.

The rotor 40 has vane accommodation grooves 46 dented radially inward from an outer peripheral wall of the rotor 40. Each vane accommodation groove 46 is formed to extend in the axial direction and to connect the end face of the rotor 40 on the lower casing 30 side with the other end face of the rotor 40 on the plate section 22 side. In the present embodiment, four vane accommodation grooves 46 are formed at equal intervals with respect to the circumferential direction of the rotor 40. Vanes 41 are accommodated in the vane accommodation grooves 46 of the rotor 40 respectively. The rotor 40 and the inner peripheral wall 211 of the cylinder section 21 are decentered from each other. Therefore, a distance between the rotor 40 and the inner peripheral wall 211 of the cylinder section 21 at a certain point of the rotor 40 changes with the rotation of the rotor 40. If the rotor 40 rotates, the vane 41 protrudes radially outward until the vane 41 contacts the inner peripheral wall 211 due to a centrifugal force. As the distance between the rotor 40 and the inner peripheral wall 211 of the cylinder section 21 at the certain point of the rotor 40 reduces, the vane 41 is pushed radially inward into the vane accommodation groove 46 more. Thus, the vane 41 reciprocates inside the vane accommodation groove 46 in the radial direction while a radially outer end portion of the vane 41 rotates in contact with the inner peripheral wall 211 of the cylinder section 21 with the rotation of the rotor 40.

Through holes 201 as first through holes are formed in the flange section 23 of the upper casing 20. In the present embodiment, three through holes 201 are formed in the flange section 23. The lower casing 30 has protruding sections 31 protruding toward the motor 11 side at positions corresponding to the through holes 201 of the upper casing 20. Through holes 32 as second through holes are formed in substantially central portions of the protruding sections 31 respectively. The through holes 32 penetrate through the lower casing 30 in a board thickness direction. The through holes 32 are formed in positions corresponding to the through holes 201 respectively. A protruding amount h of each protruding section 31 is smaller than thickness of the elastic sheet 50.

The elastic sheet 50 is interposed between the lower casing 30 and the attachment 14 of the motor 11. The elastic sheet 50 is formed in a plate-like shape with a material such as rubber having elasticity and a large damping coefficient. As shown in FIG. 3, the elastic sheet 50 has a hole 51 penetrating through the elastic sheet 50 in a board thickness direction in a central portion thereof. An internal diameter of the hole 51 is set substantially equal to a diameter of the pump chamber 24, i.e., a diameter of the opening in the end portion of the cylinder section 21 of the upper casing 20 on the lower casing 30 side. Thus, the elastic sheet 50 is formed in the shape corresponding to the shape of the flat surface section 204 of the upper casing 20.

Through holes 52 as third through holes are formed in the elastic sheet 50 at positions corresponding to the protruding sections 31 of the lower casing 30. An internal diameter of each through hole 52 is set substantially equal to or slightly larger than an external diameter of the protruding section 31. As shown in FIG. 1, each of screws 60 as screw members has a head 61 in one end portion thereof. A male screw groove 62 is formed on a part of the screw 60 from the other end portion thereof to a middle with respect to the axial direction. The attachment 14 of the motor 11 is made of a material such as a metal. Fitting holes 15 are formed in the attachment 14 at positions corresponding to the through holes 201 of the upper casing 20. Female screw grooves 16 corresponding to the male screw grooves 62 of the screws 60 are formed on inner walls of the attachment 14 where the fitting holes 15 are formed.

The screws 60 extend through the through holes 201 of the upper casing 20, the through holes 32 of the lower casing 30 and the through holes 52 of the elastic sheet 50 and are screwed to the attachment 14 formed with the fitting holes 15. Thus, the upper casing 20, the lower casing 30 and the elastic sheet 50 are held between the heads 61 of the screws 60 and the attachment 14 and thus are fixed and combined to the attachment 14. In that state, an axial force is applied between the heads 61 of the screws 60 and the attachment 14. Therefore, the elastic sheet 50 is pressed by the lower casing 30 and the attachment 14 and is compressed in the axial direction. Thus, a reaction force arises in the elastic sheet 50. The lower casing 30 receives a contact pressure from the elastic sheet 50 in a direction toward the upper casing 20. As a result, the flat surface section 301 of the lower casing 30 closely contacts the flat surface section 204 of the upper casing 20. Accordingly, the pump chamber 24 is kept airtight or liquid-tight.

The protruding sections 31 of the lower casing 30 extend through the through holes 52 of the elastic sheet 50 and are in contact with the attachment 14. As mentioned above, the protruding amount h of each protruding section 31 is smaller than the thickness of the elastic sheet 50. Therefore, when the protruding sections 31 contact the attachment 14, the elastic sheet 50 is sandwiched and compressed between the lower casing 30 and the attachment 14. Thus, the lower casing 30 receives the contact pressure due to the reaction force of the elastic sheet 50, and an interval between the lower casing 30 and the attachment 14 is kept constant at the protruding amount h of the protruding section 31.

Next, the lower flat surface 321 of the lower casing 30 and the like will be explained in more detail. As shown in FIG. 2, in the present embodiment, a point on an outer peripheral end of the lower flat surface 321 farthest from an intersection between the axis Ax1 of the shaft 13 and the lower flat surface 321 is defined as a first point P1. A point on the outer peripheral end of the lower flat surface 321 at which a virtual straight line extending from a central point O1 of the lower flat surface 321 and passing through the first point P1 intersects with the outer peripheral end of the lower flat surface 321 when the virtual straight line rotates by 90 degrees in the rotation direction of the rotor 40 around the central point O1 is defined as a second point P2. A point on the outer peripheral end of the lower flat surface 321 opposite from the second point P2 across the central point O1 is defined as a third point P3. A suction passage 26 and a discharge passage 27 are formed between the upper casing 20 and the lower casing 30. The suction passage 26 extends through the third point P3 and provides the communication between the outside and the inside of the pump chamber 24. The discharge passage 27 extends through the second point P2 and provides the communication between the inside and the outside of the pump chamber 24. In the present embodiment, the suction passage 26 and the discharge passage 27 are formed on the lower casing 30 side between the flange section 23 and the lower casing 30 (refer to FIG. 1).

Moreover, in the present embodiment, a point on the outer peripheral end of the lower flat surface 321 between the third point P3 and the first point P1 is defined as a fourth point P4. The lower flat surface 321 is inclined with respect to the axis Ax1 of the shaft 13 such that the fourth point P4 is farthest from the motor case 12 among points on the outer peripheral end of the lower flat surface 321 (refer to FIGS. 1 and 2).

Next, an operation of the vane pump 10 having the above-described construction will be explained. The rotor 40 connected with the shaft 13 rotates with the rotation of the motor 11. The vanes 41 rotate together with the rotor 40 with the rotation of the rotor 40 in contact with the inner peripheral wall 211 of the cylinder section 21. The volume (or width) of the space 25 increases along the rotation direction of the rotor 40 in the half range of the space 25 on the suction passage 26 side. Therefore, negative pressure arises near the suction passage 26 when the vanes 41 rotate together with the rotor 40. Accordingly, the fluid outside the pump chamber 24 is suctioned into the pump chamber 24 (i.e., space 25) through the suction passage 26. The volume (or width) of the space 25 decreases along the rotation direction of the rotor 40 in the half range of the space 25 on the discharge passage 27 side. Therefore, the fluid in the space 25 (i.e., pump chamber 24) is compressed when the vanes 41 rotate together with the rotor 40. The fluid is discharged to the outside of the pump chamber 24 through the discharge passage 27. In this way, the fluid is continuously suctioned and compressed by the rotation of the rotor 40.

In the present embodiment, for example, when the vane pump 10 is used in a state where the axis of the shaft 13 is substantially coincided with the vertical direction, the motor case 12 is positioned on a lower side and the upper casing 20 is positioned on an upper side, an outer edge section of an end face of the rotor 40 on the lower flat surface 321 side is invariably and slidably in contact with a point of the lower flat surface 321 close to the fourth point P4 (i.e., point S4 in FIG. 1) during the rotation of the rotor 40. Thus, even if the negative pressure arises near the suction passage 26, the rotor 40 does not incline with respect to the shaft 13 but an orientation of the rotor 40 during the rotation is stabilized, whereby the pump performance is stabilized.

As explained above, in the present embodiment, the lower flat surface 321 of the lower casing 30 is inclined with respect to the axis Ax1 of the shaft 13 such that the fourth point P4 is farthest from the motor case 12 among the points on the outer peripheral end of the lower flat surface 321. That is, the lower flat surface 321 is inclined with respect to the shaft 13 such that a distance between the lower flat surface 321 and the motor case 12 increases along a direction from the central point O1 toward the fourth point P4. Therefore, the outer edge section of the end face of the rotor 40 on the lower flat surface 321 side is invariably and slidably in contact with the point of the lower flat surface 321 close to the fourth point P4 (i.e., point S4 in FIG. 1) during the rotation of the rotor 40.

In the present embodiment, the fourth point P4 is positioned between the third point P3 (i.e., position where suction passage 26 is formed) and the first point P1 among the points on the outer peripheral end of the lower flat surface 321. That is, the outer edge section of the end face of the rotor 40 on the lower flat surface 321 side slidably contacts the point (S4) of the lower flat surface 321 in the range extending from a certain position near the suction passage 26 to a position rotated from the certain position by 90 degrees in the rotation direction of the rotor 40. Accordingly, even if the negative pressure arises near the suction passage 26 in the pump chamber 24, the inclination of the rotor 40 toward the suction passage 26 side can be inhibited.

In this way, in the present embodiment, a part of the rotor 40 is made to invariably and slidably contact some point of the lower flat surface 321 in the range from the suction passage 26 to a point distanced from the suction passage 26 by a certain distance during the rotation of the rotor 40. Thus, the orientation of the rotor 40 can be stabilized even if the negative pressure arises near the suction passage 26. Accordingly, the stable pump performance of the vane pump 10 can be maintained. In the present embodiment, the upper flat surface 221 of the plate section 22 is provided substantially perpendicularly to the axis Ax1 of the shaft 13, thereby forming a certain clearance between the upper flat surface 221 and the rotor 40.

Figure 4:
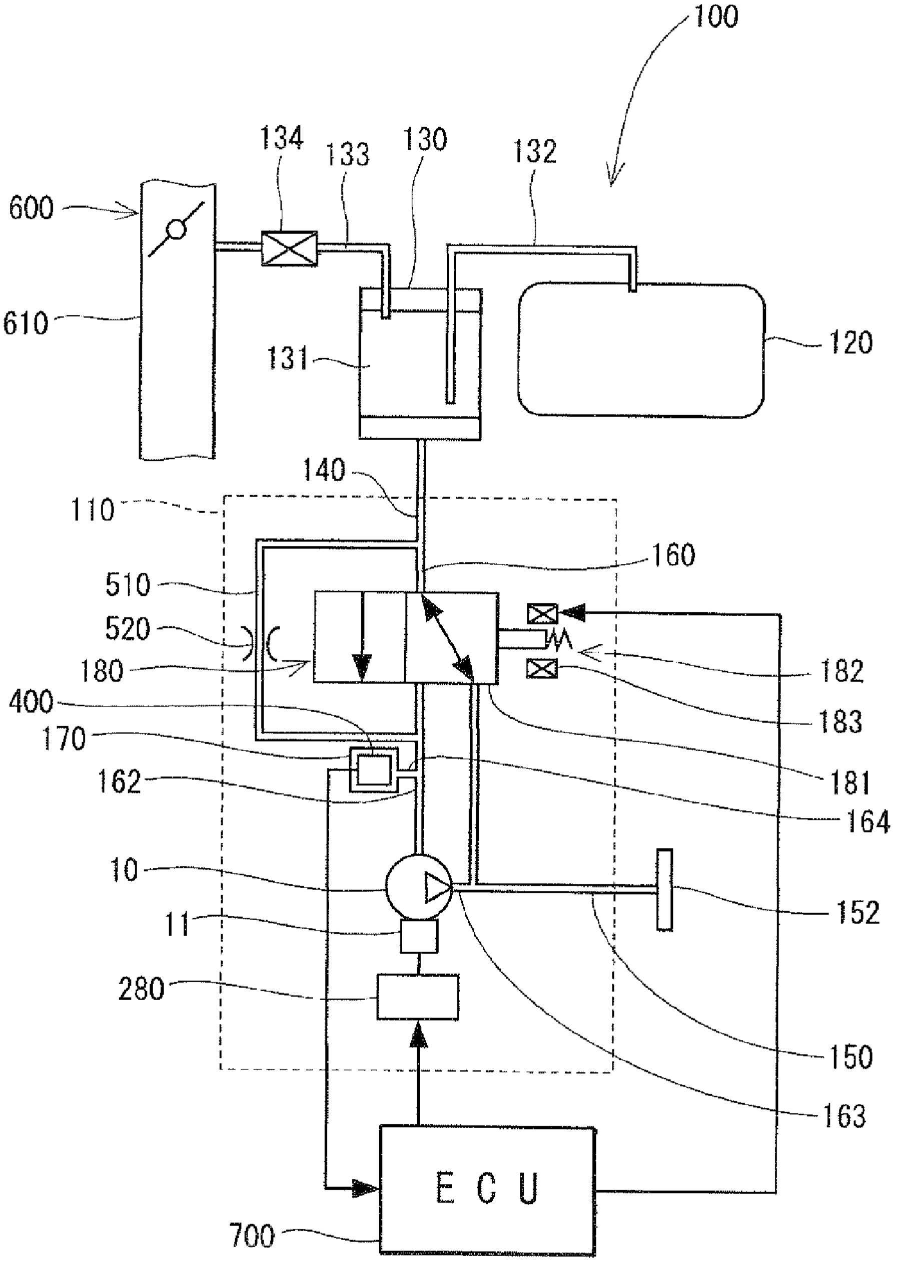
FIG. 4 is a schematic diagram showing an evaporation leak check system using the vane pump according to the first embodiment.

Next, an evaporation leak check system 100 (check system) using the vane pump 10 according to the present embodiment will be explained based on FIG. 4. In the check system 100, the vane pump 10 is used for depressurizing an inside of a fuel tank 120.

The check system 100 consists of a check module 110, the fuel tank 120, a canister 130, an air intake system 600, and an ECU 700. The check module 110 has the vane pump 10, the motor 11, a switching valve 180, a motor drive circuit 280 and a pressure sensor 400. The switching valve 180 is connected to the canister 130 via a canister passage 140. An atmosphere passage 150 has an opening end 152 opening into the atmosphere on a side opposite to the check module 110. The canister passage 140 connects to the atmosphere passage 150 via a connection passage 160. The connection passage 160 connects to the suction passage 26 (fluid inlet passage) of the vane pump 10 via a pump passage 162. The discharge passage 27 (fluid outlet passage) of the vane pump 10 connects to the atmosphere passage 150 via an ejection passage 163. A pressure introduction passage 164 branches from the pump passage 162. The pressure introduction passage 164 connects the pump passage 162 with a sensor chamber 170, in which the pressure sensor 400 is arranged. Thus, the pressure in the sensor chamber 170 substantially coincides with the pressure in the pressure introduction passage 164 and the pump passage 162.

An orifice passage 510 branches from the canister passage 140. The orifice passage 510 connects the canister passage 140 with the pump passage 162. An orifice 520 is provided in the orifice passage 510. The orifice 520 corresponds to a size of an opening providing allowable air leak containing the fuel vapor from the fuel tank 120.

The switching valve 180 has a valve main body 181 and a drive section 182. The drive section 182 drives the valve main body 181. The drive section 182 has a coil 183 connected to the ECU 700. The ECU 700 switches between energization and de-energization to the coil 183. When the coil 183 is de-energized, the communication between the connection passage 160 and the pump passage 162 is blocked, and the canister passage 140 communicates with the atmosphere passage 150 via the connection passage 160. When the coil 183 is energized, the canister passage 140 communicates with the pump passage 162, and the communication between the canister passage 140 and the atmosphere passage 150 is blocked. The orifice passage 510 invariably communicates with the pump passage 162 irrespective of whether the coil 183 is energized or de-energized.

The canister 130 has an adsorbent 131 such as activated carbon. The canister 130 is provided between the check module 110 and the fuel tank 120 to adsorb the fuel vapor generated in the fuel tank 120. The canister 130 connects to the check module 110 via the canister passage 140 and connects to the fuel tank 120 via a tank passage 132. A purge passage 133 connecting to an intake pipe 610 of the air intake system 600 connects to the canister 130. The fuel vapor generated in the fuel tank 120 is adsorbed to the adsorbent 131 when the fuel vapor passes through the tank passage 132. A purge valve 134 is provided in the purge passage 133 connecting the canister 130 with the intake pipe 610 of the air intake system 600. The purge valve 134 opens and closes the purge passage 133 according to a command from the ECU 700.

The pressure sensor 400 senses the pressure in the sensor chamber 170 and outputs a signal corresponding to the pressure to the ECU 700. The ECU 700 is constructed of a microcomputer having CPU, ROM, RAM and the like (not shown). Signals outputted from various sensors such as the pressure sensor 400 are inputted to the ECU 700. The ECU 700 controls respective parts according to the various inputted signals based on predetermined control programs stored in the ROM.

The coil 183 is not energized and the canister passage 140 communicates with the atmosphere passage 150 via the connection passage 160 during an operation of the engine and in a predetermined period after the operation of the engine is stopped. Therefore, the air containing the fuel vapor generated in the fuel tank 120 passes through the canister 130, in which the fuel vapor is removed, and then the air is emitted to the atmosphere from the open end 152 of the atmosphere passage 150.

If the predetermined period passes after the operation of the engine mounted in a vehicle is stopped, the leak check of the air containing the fuel vapor from the fuel tank 120 is started. In the check, atmospheric pressure is sensed in order to correct an error due to altitude of a place where the vehicle is parked. The atmospheric pressure is sensed by using the pressure sensor 400 provided in the sensor chamber 170. When the coil 183 is not energized, the atmosphere passage 150 communicates with the pump passage 162 via the orifice passage 510. Therefore, the pressure in the sensor chamber 170, which connects to the pump passage 162 via the pressure introduction passage 164, is substantially the same as the atmospheric pressure. Therefore, the atmospheric pressure is sensed by the pressure sensor 400 in the sensor chamber 170.

If the sensing of the atmospheric pressure is completed, the altitude of the place where the vehicle is parked is calculated from the sensed pressure. The ECU 700 corrects various parameters based on the calculated altitude. If the correction is completed, the ECU 700 energizes the coil 183 of the switching valve 180. If the coil 183 is energized, the switching valve 180 moves toward the right side in FIG. 4. Thus, the switching valve 180 blocks the communication between the atmosphere passage 150 and the canister passage 140 and provides the communication between the canister passage 140 and the pump passage 162. Therefore, the sensor chamber 170 connecting to the pump passage 162 communicates with the fuel tank 120 via the canister 130. When the fuel vapor is generated inside the fuel tank 120, the pressure in the fuel tank 120 is higher than the pressure around the vehicle, i.e., the atmospheric pressure.

If the pressure increase accompanying the generation of the fuel vapor in the fuel tank 120 is detected, the ECU 700 stops the energization to the coil 183 of the switching valve 180. If the energization to the coil 183 is stopped, the pump passage 162 communicates with the canister passage 140 and the atmosphere passage 150 via the orifice passage 520. The canister passage 140 communicates with the atmosphere passage 150 via the connection passage 160.

If the motor 11 is energized in this state, the vane pump 10 is driven and the pump passage 162 is depressurized. Accordingly, the air inflowing from the atmosphere passage 150 flows into the pump passage 162 via the orifice passage 510. The flow of the air flowing into the pump passage 162 is restricted by the orifice 520 of the orifice passage 510. Therefore, the pressure in the pump passage 162 reduces. The pressure in the pump passage 162 reduces to predetermined pressure corresponding to the opening area of the orifice 520 and then becomes constant. At that time, the sensed pressure in the pump passage 162 is recorded as reference pressure. If the sensing of the reference pressure is completed, the energization to the motor 11 is stopped.

If the reference pressure is sensed, the coil 183 of the switching valve 180 is energized again. Thus, the communication between the atmosphere passage 150 and the canister passage 140 is blocked, and the communication between the canister passage 140 and the pump passage 162 is provided. Accordingly, the fuel tank 120 communicates with the pump passage 162, and the pressure in the pump passage 162 becomes equal to the pressure in the fuel tank 120. If the motor 11 is energized, the vane pump 10 operates, thereby depressurizing the inside of the fuel tank 120. At that time, the pump passage 162 communicates with the fuel tank 120. Therefore, the pressure sensed by the pressure sensor 400 in the sensor chamber 170 communicating with the pump passage 162 is substantially the same as the pressure inside the fuel tank 120.

If the pressure inside the sensor chamber 170 (i.e., pressure inside fuel tank 120) becomes lower than the previously-sensed reference pressure due to continuation of the operation of the vane pump 10, it is determined that the leak of the air containing the fuel vapor from the fuel tank 120 is an allowable level or lower. That is, when the pressure inside the fuel tank 120 decreases to pressure lower than the reference pressure, there is no invasion of air from the outside to the inside of the fuel tank 120 or the amount of the invasive air is equal to or smaller than the flow amount defined by the orifice 520. Therefore, it is determined that the air-tightness of the fuel tank 120 is secured sufficiently.

If the pressure inside the fuel tank 120 does not decrease to the reference pressure, it is determined that the air leak containing the fuel vapor from the fuel tank 120 is larger than the allowable level. That is, when the pressure inside the fuel tank 120 does not decrease to the reference pressure, it is thought that the air invades from the outside into the fuel tank 120 with the depressurization of the inside of the fuel tank 120. Therefore, it is determined that the air-tightness of the fuel tank 120 is not secured sufficiently.

If the leak check of the air containing the fuel vapor is completed, the energization to the motor 11 and the switching valve 180 is stopped. After the ECU 700 detects that the pressure in the pump passage 162 recovers to the atmospheric pressure, the ECU 700 stops the operation of the pressure sensor 400 and ends the check process.

As described above, the vane pump 10 according to the first embodiment can maintain the stable pump performance. Therefore, when the vane pump 10 according to the first embodiment is used in the check system 100, the vane pump 10 capable of maintaining the stable pump performance can be used for depressurizing the inside of the fuel tank 120. Therefore, the stable check performance of the check system 100 can be maintained.

(Second Embodiment)

Figure 5:
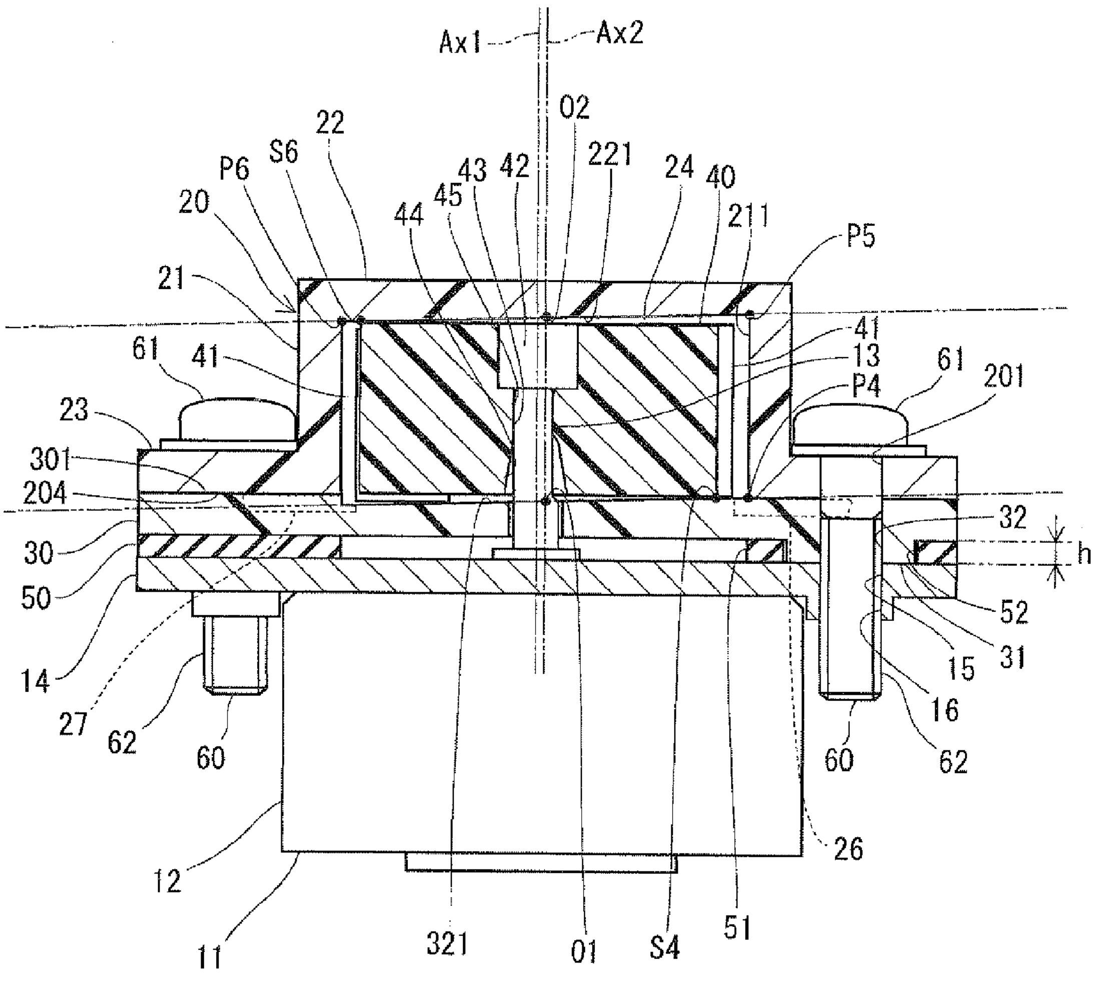
FIG. 5 is a cross-sectional view showing a vane pump according to a second embodiment of the present invention.

Next, a second embodiment of the present invention will be described. FIG. 5 is a cross-sectional view showing a vane pump according to the second embodiment. In the second embodiment, the inclination of the upper flat surface formed on the plate section of the upper casing with respect to the motor shaft is different from the first embodiment.

In the second embodiment, a point on an outer peripheral end of the upper flat surface 221 of the plate section 22 of the upper casing 20 crossing a virtual straight line that passes through the fourth point P4 on the outer peripheral end of the lower flat surface 321 and that extends in parallel with an axis Ax2 of the cylinder section 21 is defined as a fifth point P5. The upper flat surface 221 is inclined with respect to the axis Ax1 of the shaft 13 such that the fifth point P5 is farthest from the motor case 12 among points on the outer peripheral end of the upper flat surface 221. That is, the upper flat surface 221 of the plate section 22 inclines with respect to the shaft 13 such that a distance between the upper flat surface 221 and the motor case 12 increases along a direction from a central point O2 of the upper flat surface 221 toward the fifth point P5. In such the construction, a point on the outer peripheral end of the upper flat surface 221 at a position opposite from the fifth point P5 across the central point O2 is defined as a sixth point P6. In such the case, the outer edge section of the end face of the rotor 40 on the lower flat surface 321 side can be invariably and slidably in contact with the point (S4 in FIG. 5) of the lower flat surface 321 near the fourth point P4 during the rotation of the rotor 40. In addition, also an outer edge section of an end face of the rotor 40 on the upper fiat surface 221 side can be slidably in contact with a point (S6 in FIG. 5) of the upper flat surface 221 near the sixth point P6 during the rotation of the rotor 40. Thus, the orientation of the rotor 40 during the rotation can be stabilized further.

(Third Embodiment)

Figure 6:
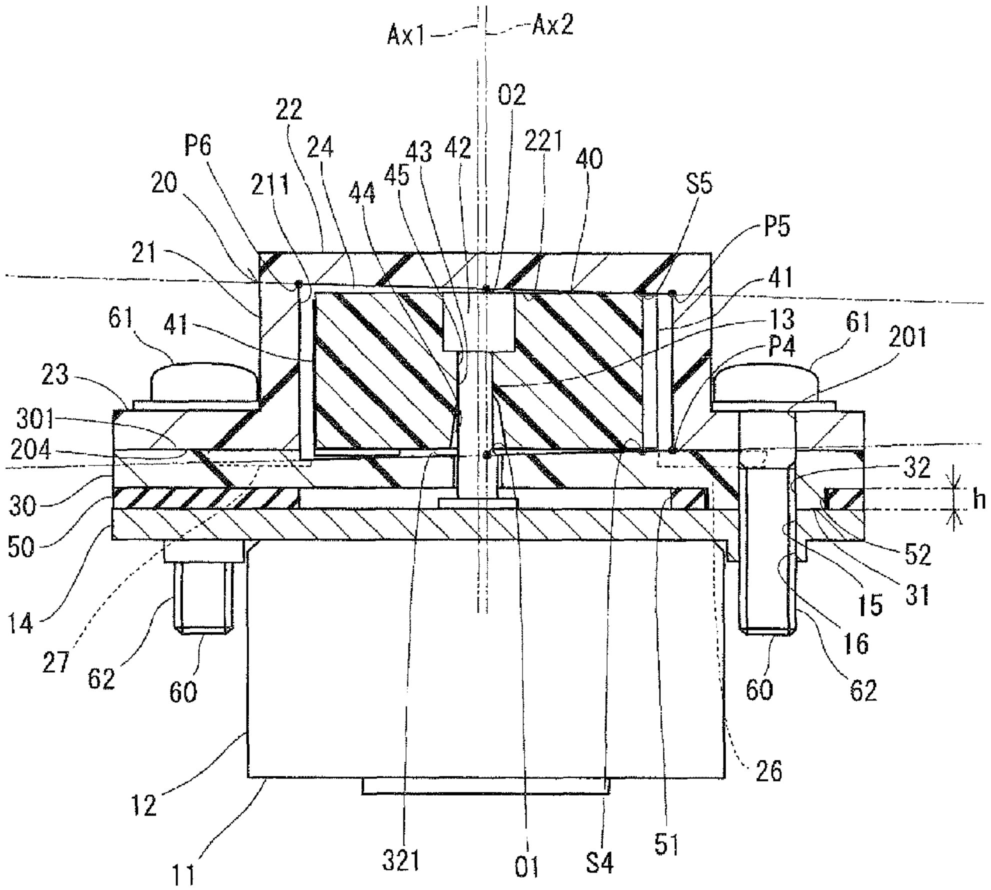
FIG. 6 is a cross-sectional view showing a vane pump according to a third embodiment of the present invention.

Next, a third embodiment of the present invention will be described. FIG. 6 is a cross-sectional view showing a vane pump according to the third embodiment. In the third embodiment, the inclination of the upper flat surface formed on the plate section of the upper casing with respect to the motor shaft is different from the first embodiment and the second embodiment.

in the third embodiment, a point on the outer peripheral end of the upper flat surface 221 of the plate section 22 of the upper casing 20 crossing a virtual straight line that passes through the fourth point P4 on the outer peripheral end of the lower flat surface 321 and that extends in parallel with the axis Ax2 of the cylinder section 21 is defined as a fifth point P5. The upper flat surface 221 is inclined with respect to the axis Ax1 of the shaft 13 such that the fifth point P5 is closest to the motor case 12 among points on the outer peripheral end of the upper flat surface 221. That is, the upper flat surface 221 of the plate section 22 inclines with respect to the shaft 13 such that a distance between the upper flat surface 221 and the motor case 12 decreases along a direction from the central point O2 of the upper flat surface 221 toward the fifth point P5. With such the construction, the outer edge section of the end face of the rotor 40 on the lower flat surface 321 side can be invariably and slidably in contact with the point (S4 in FIG. 6) of the lower flat surface 321 near the fourth point P4 during the rotation of the rotor 40. In addition, also the outer edge section of the end face of the rotor 40 on the upper flat surface 221 side can be slidably in contact with a point (point S5 in FIG. 6) of the upper flat surface 221 near the fifth point P5 during the rotation of the rotor 40. Thus, the orientation of the rotor 40 during the rotation can be stabilized further.

(Fourth Embodiment)

Figure 7:
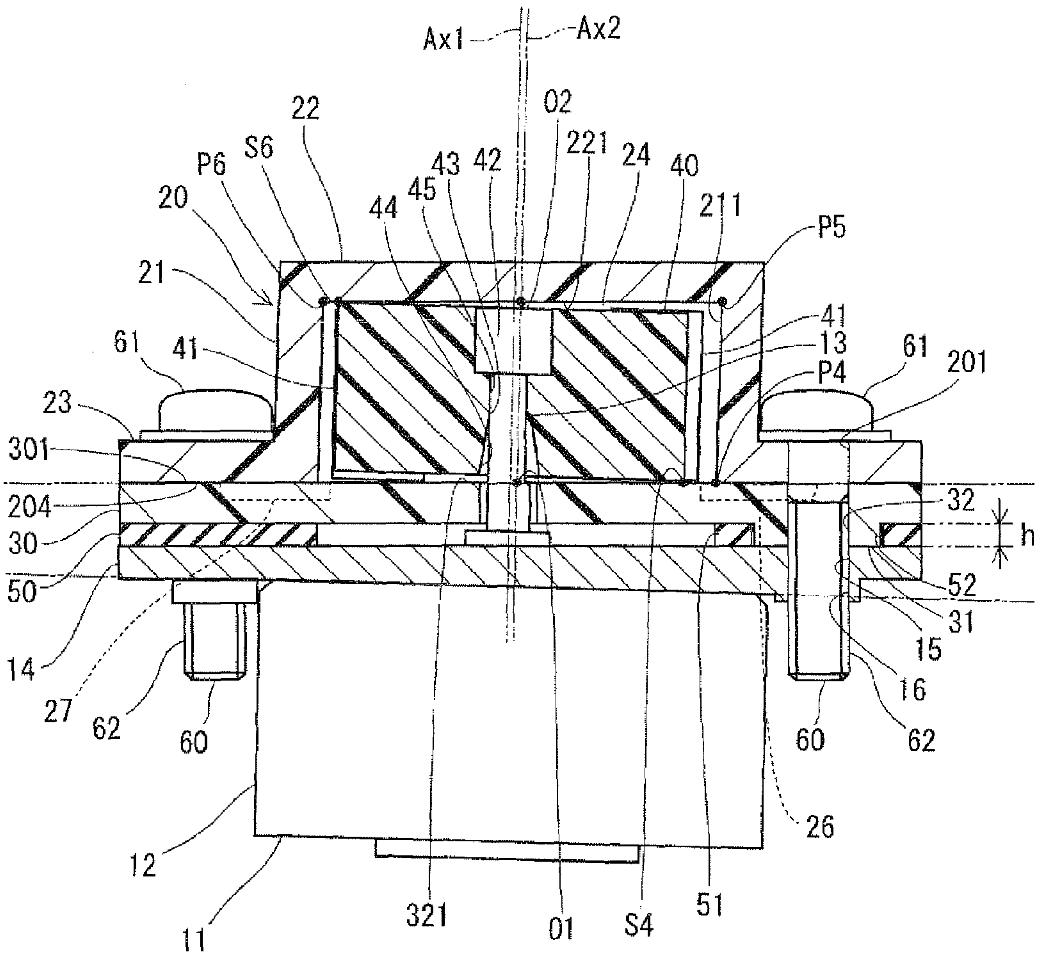
FIG. 7 is a cross-sectional view showing a vane pump according to a fourth embodiment of the present invention.

Next, a fourth embodiment of the present invention will be described. FIG. 7 is a cross-sectional view showing a vane pump according to the fourth embodiment. The fourth embodiment differs from the first to third embodiments in that a motor and the other members are combined in a state where the motor and the other members are inclined from each other in the fourth embodiment.

In the fourth embodiment, the motor case 12 and the attachment 14 are combined such that the shaft 13 of the motor 11 inclines with respect to a wall surface of the attachment 14 on the lower casing 30 side. The lower flat surface 321 of the lower casing 30 and the upper flat surface 221 of the plate section 22 of the upper casing 20 are parallel to the wall surface of the attachment 14 on the lower casing 30 side. That is, the lower casing 30 and the upper casing 20 are fixed to the attachment 14 such that the shaft 13 inclines with respect to the lower flat surface 321 and the upper flat surface 221. The cylinder section 21 is provided such that the axis Ax2 of the cylinder section 21 is parallel to the axis Ax1 of the shaft 13. That is, the inner peripheral wall 211 of the cylinder section 21 is parallel to the axis Ax1 of the shaft 13.

In the above-described construction according to the present embodiment, the lower flat surface 321 is inclined with respect to the axis Ax1 of the shaft 13 such that the fourth point P4 is farthest from the motor case 12 among the points on the outer peripheral end of the lower flat surface 321. That is, the lower flat surface 321 inclines with respect to the shaft 13 such that a distance between the lower flat surface 321 and the motor case 12 increases along a direction from the central point O1 of the lower flat surface 321 toward the fourth point P4. The upper flat surface 221 is inclined with respect to the axis Ax1 of the shaft 13 such that the fifth point P5 is farthest from the motor case 12 among the points on the outer peripheral end of the upper flat surface 221. That is, the upper flat surface 221 of the plate section 22 inclines with respect to the shaft 13 such that a distance between the upper flat surface 221 and the motor case 12 increases along a direction from the central point O2 of the upper flat surface 221 toward the fifth point P5. With such the construction, the outer edge section of the end face of the rotor 40 on the lower flat surface 321 side can be invariably and slidably in contact with the point (S4 in FIG. 7) of the lower flat surface 321 near the fourth point P4 during the rotation of the rotor 40. In addition, also the outer edge section of the end face of the rotor 40 on the upper flat surface 221 side can be slidably in contact with a point (S6 in FIG. 7) of the upper flat surface 221 near the sixth point P6 during the rotation of the rotor 40. Thus, the orientation of the rotor 40 during the rotation can be stabilized further.

In this way, the fourth embodiment differs from the first to third embodiments in that the motor 11 and the other members are combined in the state where the motor 11 and the other members are inclined from each other in the fourth embodiment. However, the relationship among the lower flat surface 321, the upper flat surface 221 and the shaft 13 is the same as the second embodiment.

(Modifications)

In the above-described embodiments, the fourth point on the outer peripheral end of the lower flat surface is positioned between the third point and the first point. Alternatively, the fourth point may coincide with the third point or the first point. For example, when the fourth point coincides with the third point, the suction passage is formed to pass through the fourth point. In this case, the lower flat surface inclines with respect to the axis of the shaft such that a distance between the lower flat surface and the motor case increases along a direction from the discharge passage side toward the suction passage side. In such the construction, the outer edge section of the end face of the rotor on the lower flat surface side is invariably and slidably in contact with a point of the lower flat surface near the fourth point, i.e., a point near the suction passage, during the rotation of the rotor. Thus, the orientation of the rotor during the rotation of the rotor can be stabilized even if the negative pressure arises near the suction passage. In this way, in the modification, the fourth point may be any point on the outer peripheral end of the lower flat surface in the range from the third point to the first point.

In the fourth embodiment described above, the upper flat surface is parallel to the lower flat surface and is inclined with respect to the shaft such that the distance between the upper flat surface and the motor case increases along the direction from the central point toward the fifth point. Alternatively, the upper flat surface may be perpendicular to the axis of the shaft. Alternatively, the upper flat surface may be inclined with respect to the shaft such that the distance between the upper flat surface and the motor case decreases along the direction from the central point toward the fifth point.

The plate section and the cylinder section of the upper casing may be separate bodies instead of the integral body. The motor case and the attachment may be formed as a single body.

In the above-described embodiments, the present invention is applied to the evaporation leak check system that checks the leak of the fuel vapor by depressurizing the inside of the fuel tank. Alternatively, the present invention may be applied to a check system that checks the leak of the fuel vapor by pressuring the inside of the fuel tank. Alternatively, the present invention may be applied to various kinds of known devices decompressing or compressing a fluid.

The vane pump according to each of the second to fourth embodiments may be applied to an evaporation leak check system.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vane pump comprising:

an upper casing in the shape of a cylinder with a bottom consisting of a cylinder section substantially in the shape of a circular cylinder and a plate section having an upper flat surface substantially in a round shape blocking an opening in an end portion of the cylinder section on a first side of the vane pump;

a plate-like lower casing having a lower flat surface substantially in a round shape blocking an opening in an end potion of the upper casing on a second side of the vane pump, the lower casing defining a pump chamber inside the lower flat surface, the upper flat surface and an inner peripheral wall of the cylinder section;

a rotor substantially in the shape of a circular cylinder that is rotatably accommodated in the pump chamber to be decentered with respect to the cylinder section and that has a central hole penetrating through a central portion thereof in an axial direction and a plurality of vanes capable of sliding on the inner peripheral wall of the cylinder section; and a motor having a motor case substantially in the shape of a circular cylinder provided on a side of the lower casing opposite to the plate section and a shaft that extends from the motor case in the axial direction and that is loosely fitted in the central hole, the motor driving and rotating the rotor by rotating the shaft, wherein a first point on an outer peripheral end of the lower flat surface farthest from an intersection between an axis of the shaft and the lower flat surface, a second point on the outer peripheral end of the lower flat surface at which a virtual straight line extending from a central point of the lower flat surface and passing through the first point intersects with the outer peripheral end of the lower flat surface when the virtual straight line rotates by 90 degrees in a rotation direction of the rotor around the central point, a third point on the outer peripheral end of the lower flat surface opposite from the second point across the central point, a fourth point on the outer peripheral end of the lower flat surface in a range from the third point to the first point, a suction passage passing through the third point for connecting an outside and an inside of the pump chamber and for passing a fluid suctioned to the inside of the pump chamber is formed between the upper casing and the lower casing, a discharge passage passing through the second point for connecting the inside and the outside of the pump chamber and for passing the fluid discharged to the outside of the pump chamber is formed between the upper casing and the lower casing, and the lower flat surface is configured to incline with respect to the axis of the shaft such that the fourth point is farthest from the motor case among points on the outer peripheral end of the lower flat surface.

2. The vane pump as in claim 1, wherein a fifth point on an outer peripheral end of the upper flat surface crossing a virtual straight line that passes through the fourth point and that extends in parallel with an axis of the cylinder section, and the upper flat surface is configured to incline with respect to the axis of the shaft such that the fifth point is farthest from the motor case among points on the outer peripheral end of the upper flat surface.

3. The vane pump as in claim 1, wherein a fifth point on an outer peripheral end of the upper flat surface crossing a virtual straight line that passes through the fourth point and that extends in parallel with an axis of the cylinder section, and the upper flat surface is configured to incline with respect to the axis of the shaft such that the fifth point is closest to the motor case among points on the outer peripheral end of the upper flat surface.

4. An evaporation leak check system comprising:

the vane pump as in claim 1, wherein the evaporation leak check system depressurizes or pressurizes an inside of a fuel tank with the vane pump to detect leak of fuel vapor from the fuel tank.

5. The evaporation leak check system as in claim 4, wherein a fifth point on an outer peripheral end of the upper flat surface crossing a virtual straight line that passes through the fourth point and that extends in parallel with an axis of the cylinder section, and the upper flat surface is configured to incline with respect to the axis of the shaft such that the fifth point is farthest from the motor case among points on the outer peripheral end of the upper flat surface.

6. The evaporation leak check system as in claim 4, wherein a fifth point on an outer peripheral end of the upper flat surface crossing a virtual straight line that passes through the fourth point and that extends in parallel with an axis of the cylinder section, and the upper flat surface is configured to incline with respect to the axis of the shaft such that the fifth point is closest to the motor case among points on the outer peripheral end of the upper flat surface.

* * * * *